US010853889B2

(12) United States Patent
Pomer et al.

(10) Patent No.: US 10,853,889 B2
(45) Date of Patent: Dec. 1, 2020

(54) TRANSACTION TRACKING AND DISPLAY

(71) Applicant: NICE LTD., Ra'anana (IL)

(72) Inventors: Yoram Pomer, Pardes Hana (IL);
Sivan Landau, Givat Haim Ihud (IL);
Itai Veltzman, Gan Yavne (IL)

(73) Assignee: NICE LTD., Ra'anana (IL)

( * ) Notice: Subject to any disclaimer, the term of this patent is extended or adjusted under 35 U.S.C. 154(b) by 246 days.

(21) Appl. No.: 16/205,531

(22) Filed: Nov. 30, 2018

(65) Prior Publication Data
US 2019/0096006 A1 Mar. 28, 2019

Related U.S. Application Data

(63) Continuation of application No. 14/708,971, filed on May 11, 2015, now Pat. No. 10,147,144.

(51) Int. Cl.
G06Q 40/00 (2012.01)
G06Q 40/04 (2012.01)

(52) U.S. Cl.
CPC ........... G06Q 40/128 (2013.12); G06Q 40/04 (2013.01)

(58) Field of Classification Search
None
See application file for complete search history.

(56) References Cited

U.S. PATENT DOCUMENTS

| 7,899,736 | B1 | 3/2011 | Buck | |
|---|---|---|---|---|
| 7,933,828 | B2 | 4/2011 | Bandman et al. | |
| 8,438,089 | B1 | 5/2013 | Wasserblat et al. | |
| 8,600,859 | B2 | 12/2013 | Lanng | |
| 8,694,405 | B2 | 4/2014 | Parga Landa | |
| 2004/0172322 | A1 | 9/2004 | Tenorio | |
| 2005/0228735 | A1 | 10/2005 | Duquette | |
| 2008/0115079 | A1* | 5/2008 | Mather | G06Q 40/06 715/774 |
| 2011/0178950 | A1* | 7/2011 | Parga Landa | G06Q 40/06 705/36 R |
| 2016/0328797 | A1* | 11/2016 | Figy | G06Q 40/04 |

* cited by examiner

Primary Examiner — Scott A Zare
(74) Attorney, Agent, or Firm — Pearl Cohen Zedek Latzer Baratz LLP

(57) ABSTRACT

A transaction tracking system includes a display that permits viewing the relationship between related transactions. In the display, individual transactions are depicted as transaction icons sorted in time order horizontal rows according to order ID.

20 Claims, 3 Drawing Sheets

TRANSACTION TRACKING AND DISPLAY

PRIOR APPLICATION DATA

The present application is a continuation of prior application Ser. No. 14/708,971, filed May 11, 2015, entitled "TRANSACTION TRACKING AND DISPLAY", incorporated herein by reference in its entirety.

BACKGROUND OF THE INVENTION

Financial firms are responsible for ensuring that traders maintain integrity in the markets. This is a complicated, time-sensitive challenge that entails analyzing large amounts of structured and unstructured market, trading and communications data. Compliance departments use the results of the analysis to monitor for potential market abuse or manipulation by traders. Occasionally, the results of the analysis will generate an alert that will prompt further investigation into trader activity. When an investigation occurs, users need to swiftly understand the sequence of orders and executed transactions, how the instruments were traded, where the transactions occurred, the relationship of the trades to account owners, what communication was associated with the transactions, and other information relevant to the trade.

Conventionally, information relating to transactions has been displayed either in textual grid format or in a time-dependent graph. A grid has primarily text content, for example, a specific transaction ID aligned with related transaction information in columnar format. This allows elements to be sorted by a single dimension only. In contrast, a graph format typically displays, for example, price fluctuation as a function of time, and may allow hovering over a specific transaction to display additional transaction information. However, neither of these conventional display formats shows all transactions associated with a specific alert, with the sequence and relationship between them.

U.S. Pat. No. 8,438,089 describes a method and apparatus for transaction verification which includes matching transaction details with a record of communications between parties regarding a transaction event. In the system, alerts may be generated to flag a transaction based on a matching score comparing the transaction record with the details of the transaction. However, heretofore there has not been a system of transaction tracking which permits a view of transactions relating to an alert (or other criteria) that shows the relationship between the transactions. The disclosure of U.S. Pat. No. 8,438,089 is incorporated by reference.

SUMMARY OF THE INVENTION

Thus, an object of the invention is to allow an investigator to track related transactions in a visual format.

Another object of the invention is to sort transactions and create alerts based on predetermined criteria, and then display transactions related to the alert to facilitate identification of suspicious activity.

This object is achieved according to the invention, in one aspect, with a method of tracking and displaying transactions, in which transactions data is loaded along with identifying metadata associated with the transactions data, including transaction type metadata (whether an order or an execution), order identification metadata ("order ID"), customer type metadata, and triggering transaction metadata. The transactions are sorted by time-stamp and then placed on a display by iteratively (a) creating a new sequence line on a display for each unique order ID; and (b) placing the orders in time-stamp order on the created sequence line. For each execution, the same process is repeated, i.e., iteratively (a) creating a new sequence line on a display for each unique order identification; and (b) placing the executions in time-stamp order on the sequence line. The transactions identified as triggering transactions according to predetermined criteria are marked; and for each sequence line the percentage of orders executed on the sequence line is calculated and displayed.

A system for transaction tracking according to the invention includes a display which provides information from related transactions. The display includes a horizontal time axis so that each position on the horizontal time axis denotes a unique sequential time of a transaction; and a vertical transaction relationship axis representing transaction information, so that vertically separated rows are identified by unique order identification information. In the display, a plurality of transaction icons, each icon representing a single transaction, is positioned in at least one row on the display.

In particular embodiments, the transaction icons each have the same width in the first axis and the same height in the second axis, and are positioned in rows on the display in time-stamp order, with each row corresponding to a unique order ID, which permits a "birds-eye-view" of a set of transactions that are related to a triggering transaction according to an alert. The triggering transaction may be identified, and other information including transaction type information, order identification information, and customer type information may be included in the display next to the transaction icons or next to the sequence rows.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
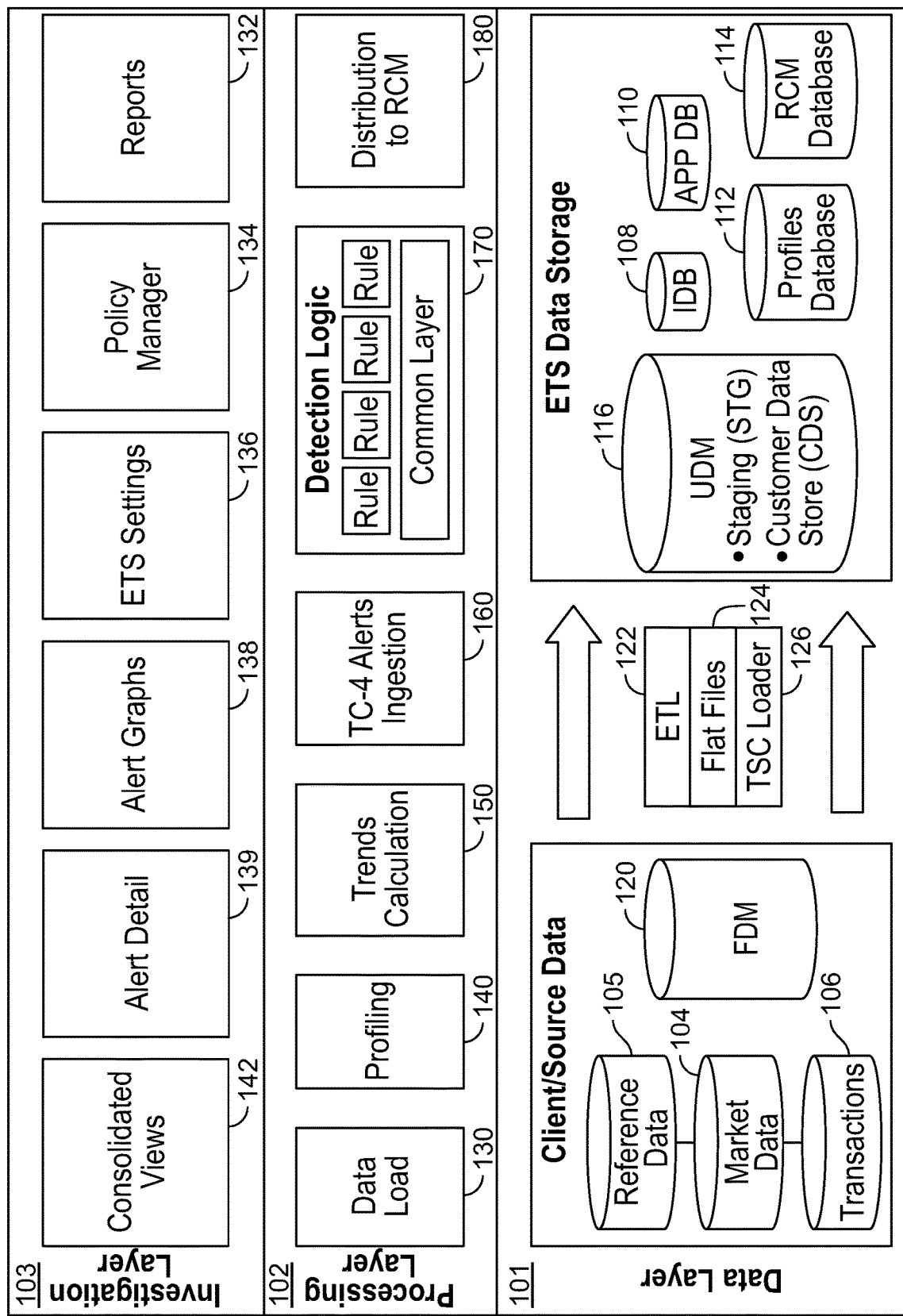
FIG. 1 is a schematic illustration of a system for transaction tracking, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The specification and claims make reference to a "display," which refers to the ordering of visual information on a physical display such as a computer screen, a tablet screen, a mobile device screen, or the like. Display "outputs" means signals representing graphical outputs directed to the display device. Therefore, the display, the display outputs and the display device are closely related concepts, as the display cannot exist without the display device and the display outputs. It will be understood by the person of ordinary skill in the art that the organization of information in a Graphical User Interface (GUI) is not an organization of abstract ideas but of physical elements on the display. And the selection and organization of elements in a display is not a theoretical exercise, but is limited by available data and the ability to process them. An important aspect of the invention is the amount and quality of the information available in a single view, which is a transformative use of the underlying data.

FIG. 1 depicts the architecture of the system of the invention. The architecture is divided into data layer 101, processing layer 102 and investigation layer 103. Data layer 101 includes client/source data, including for example market data 104, reference data 105, and data relating to individual transactions 106 loaded from multiple data sources to one or more Enterprise Trade Surveillance (ETS) databases 108, 110, 112, 114. These data may include trade or order information, and may describe transaction parameters such as customer ID, trader ID, price, transaction subject (e.g. trade, swap, option), amount, currency, or other relevant parameters, including alert-related data used for investigation, tuning and reporting, as well as ETS configurations and settings and profiles data required for detection rules.

Transaction information includes time-stamp information, transaction type information, order identification information and customer type information, and may include other information relevant to a transaction or an alert. Time stamp information permits each transaction to be represented on a horizontal axis according to the temporal sequence of events. Order identification information permits the transaction icons to be positioned in rows according to unique orders. A unique order is characterized by the intent of a party or entity to perform a transaction with respect to a property. For example, a customer may wish to buy a certain number of securities shares at a specific price. This may result in one or more orders and one or more executions may be required to effectuate the customer's intent. The initial order may be amended as to price and/or quantity in the course of dealing. However, all of these transactions may have the same unique order identification ("order ID"), and may thus appear on a single horizontal row in the sequence view. In contrast, trades by different parties or entities, or made with respect to different properties, generally may not have the same order ID, so that such transactions would appear on different rows.

Other relevant information may be included in the data layer 101 and reflected in the ultimate view(s). Other relevant information includes, without limitation, communications data, such as the communications between a trader and a customer relating to a transaction, as described in the aforesaid U.S. Pat. No. 8,438,089 for example. Data from news feeds, and the like, may also be included for the purpose of identifying suspicious activity, making an alert, and this data may be further included in a display, in addition to the elements of the sequence view described herein.

Client source data are loaded into Unified Data Manager (UDM) 116 through the (Extract/Transform/Load) ETL/flat files 122, 124. Data from the Financial Data Model (FDM) 120 is loaded into the UDM with a Trade Surveillance Connector 126.

Profiles database 112 may include summaries of past transactional and event data. For example, profile information may include average account balance, number of check returns, reference data (e.g., addresses, phone number, number of employees) and identifying data (e.g., indices).

Above the data layer 101 conceptually is the processing layer 102 where most systems processes are performed. A data load module 130 loads relevant data from the UDM 116 for processing by detection rules which are configured to identify triggering transactions and to create alerts. A profiling module 140 manages transaction data into profiles. TC-4 Alerts Ingestion 160 parses and loads alerts and related data, which permits the application of rules in detection logic 170 to create alerts. The issues or alerts detected in the detection logic 170 are distributed to the risk case manager (RCM) 180.

Above the processing layer 102 is investigation layer 103 where the display and GUI are evident to the user. The modules within the investigation layer may include: reports module 132, which computes statistics about work items, workload and other activities; an alert detail 139 which depicts the results of an alert; a policy manager module 134 which computes user-defined detection rules to determine whether an alert should be generated; ETS settings module 136 which defines common thresholds, specific thresholds per rule, and rule instances, as well as include/exclude lists configured at the system level for a specific rule. Alert graph module 138 and consolidated views module 142 present the formatted display, such as described below in a sequence view embodiment according to FIG. 3.

As known in the art, some or all of components of the data layer, processing layer and investigation layer comprise software executed on one or more processors on different computing devices, or they may be part of the same centralized system or server, sharing processing and memory units, or executed by multiple processors or memory units. Any or all processor(s) may include, for example, a central processing unit (CPU), a digital signal processor (DSP), a microprocessor, a controller, a chip, a microchip, an integrated circuit (IC), or any other suitable multi-purpose or specific processor or controller and memory unit(s), such as a random access memory (RAM), a dynamic RAM (DRAM), a flash memory, a volatile memory, a non-volatile memory, a cache memory, a buffer, a short term memory unit, a long term memory unit, or other suitable memory units or storage units.

Transaction information includes different categories of information that assist with tracking a transaction, and in particular tracking a relationship between transactions and creating alerts. The different categories of transaction information include: transaction type information, which indicates whether a particular order is a new order, an amended order or a canceled order; customer type information, which indicates whether a customer placing an order is a broker, an employee, or if the trade is a proprietary trade; transaction type information which indicates whether the order is an order or an execution; and buy/sell information, which indicates whether the order is a buy order or a sell order. Other types of transaction information may be included as metadata summarizing the different categories of transaction information relating to a transaction loaded into the system. The metadata may also indicate whether the transaction is a triggering transaction.

Figure 2:
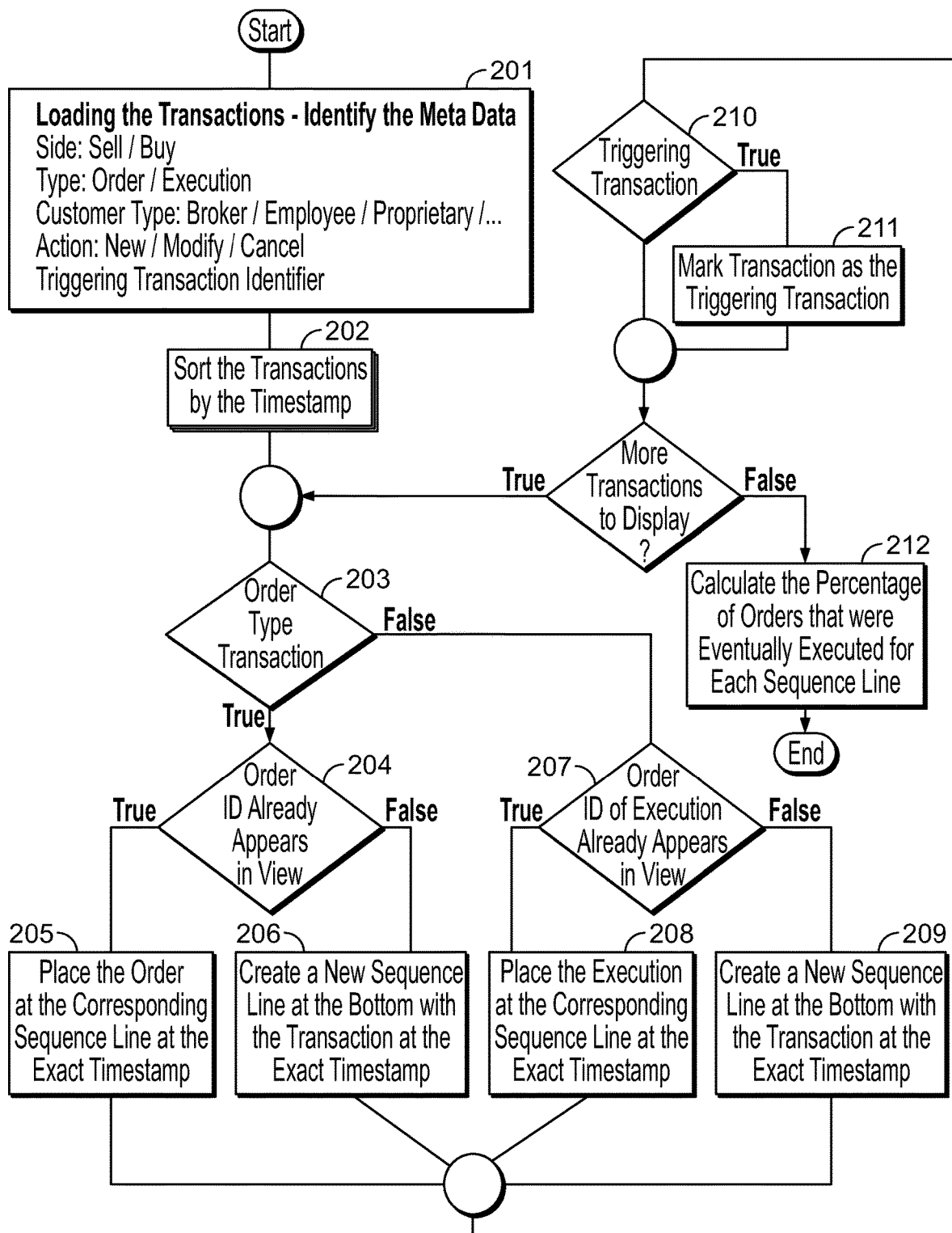
FIG. 2 is a flowchart of a method of transaction tracking and display, according to an embodiment of the invention.

An embodiment of the method for tracking and displaying transactions according to the invention is described in FIG. 2, in which transactions identified as suspicious according to a specific alert are loaded into the system. In a first step, the transactions and associated metadata are loaded in module 201. Transactions are buy orders, sell orders, and corresponding buy order executions and sell order executions. Identifying metadata associated with the transactions includes transaction type metadata, for example, the time-stamp, whether the transaction is an order or an execution; and whether the order or execution is on the buy side or the sell side of the transaction. Identifying metadata may include customer type metadata, whether the customer is a broker, employee or proprietor conducting proprietary trades. Identifying metadata may identify the transaction type as "new", "amended" or "canceled". Identifying metadata also identify particular transactions with a "triggering transaction identifier".

The transactions loaded in module 201 are identified within an alert describing a particular model of suspicious activity. The model identifies a triggering transaction and related transactions according to the model. For example, Off Market Trading (OMT) identifies firm transactions not executed at market price which may have an impact on published reference prices. The triggering transaction in this case will be the last execution executed at a price different from the market price. The present invention is primarily involved with sorting and displaying such transactions, rather than in the details of identifying the transactions according to a model.

Once the transactions, the related metadata and the triggering transaction identifier are loaded; the transactions are sorted by time-stamp at 202. The transactions sorted by time stamp are sorted into orders and executions at 203. For each order, it is determined at 204 whether the order ID of that order has been placed in the display. If the order ID is unique, i.e., has not been placed in the display, a horizontal sequence line is created at 206. For orders having an order ID that already appears in the display, the order is placed in time-stamp order on the sequence line at 205. The same procedure is followed for execution orders at 207, determining whether the order ID of the execution is present on the display, and then, iteratively, (a) creating a new sequence line for each unique order ID at 209; and (b) placing the executions in time-stamp order on the sequence line at 208. At 210, if the transaction is a triggering transaction, it is so marked at 211. When all of the loaded transactions have been processed in this manner, the percentage of orders that were executed for each order ID is calculated.

Figure 3:
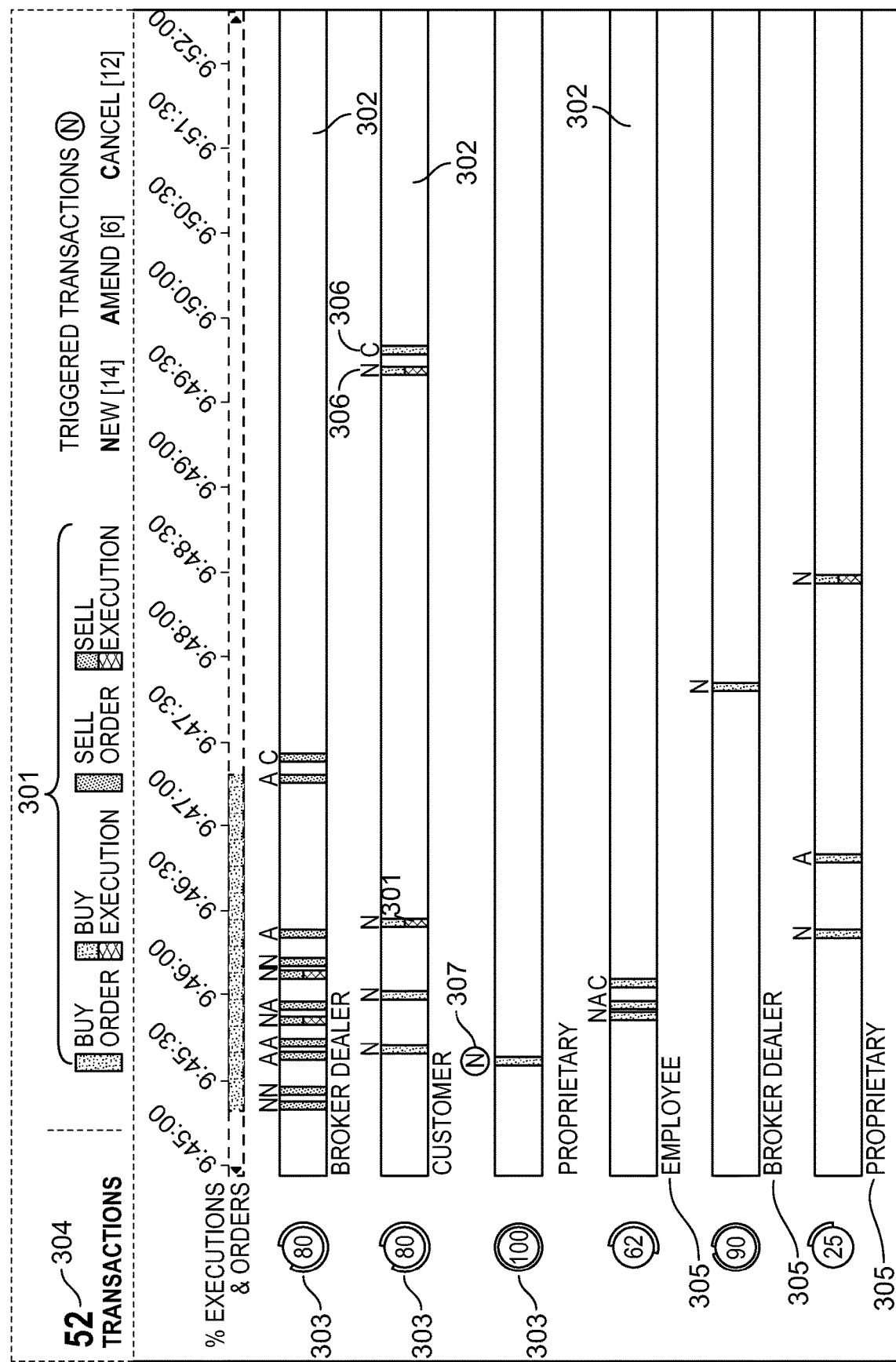
FIG. 3 is a graphic depicting a sample display generated according to an embodiment of the invention.

The advantages of sorting the transaction information in this unique way are evident from FIG. 3, wherein each transaction of the same type in the display is depicted as a transaction icon 301 having the same height and width. The form and color of the transaction icons 301 are variable so that each transaction icon graphically identifies the transaction as a buy order, a buy execution, a sell order or a sell execution, based on distinct color and graphic content. In the embodiment of FIG. 3 all of the transaction icons 301 have the same size. While, it may be desirable to have transaction icons on the horizontal sequence lines with different sizes, in a presently preferred embodiment for visual impact, the transaction icons have the same vertical height and horizontal width. In FIG. 3, a legend appears on the top of the display showing how the similarly sized transaction icons depict the transaction type with different form and color of the icon. Each transaction is placed on a horizontal row based on its time stamp.

The transaction icons 301 are arranged in time-stamp sequence on horizontal rows or sequence lines 302 corresponding to a unique order ID. A graphic 303 depicting the number of orders corresponding to an order ID and a percentage of orders that were executed for that order ID may be depicted next to the sequence line 302. This graphic 303 will depict how much of an order was filled and what is left to be filled, this will be important in the compliance context for understanding if the order is fictitious or has the intent to be fulfilled. The overall number of related transactions is depicted in another graphic box 304, which refers to all transactions that participated in the logic of the model. So, for example, in the OMT model described above, this would be a number of transactions executed in a given time window for a specific account and product. In the embodiment of FIG. 3, a customer type label 305 is provided next to each horizontal bar representing a unique order ID. In the example of FIG. 3, this information is represented immediately below the respective sequence line. A customer type includes, without limitation, "broker-dealer", "customer", 'employee" and "proprietary". Similarly, transaction type information indicating whether the transaction is a new, amended or canceled transaction is provided in the form of a graphic 306 immediately above or below the transaction icon, in the case of FIG. 3, immediately above the transaction icon 301.

Alerts are configured to identify transactions or sets of transactions that are of interest to an investigator. Another example of trading activity that would be of interest to an investigator is so-called "front running" a practice of market makers of dealing on advance information before their clients have been given the information. In the example of FIG. 3, a single transaction is identified as the triggering transaction with a label 307 on the display. Thus in FIG. 3, an alert for front running is depicted with a single triggering transaction and the different related transactions positioned in time sequence and separated vertically according to unique order ID. This "sequence view" offers a unique perspective on this information not available in the prior art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. A method of tracking and displaying transactions, comprising:
   loading transactions related to an alert including one triggering transaction into a software module running on a processor;

identifying metadata associated with the transactions, including transaction type metadata, order identification metadata, customer type metadata, and triggering transaction metadata;

sorting the transactions by time-stamp;

sorting the transactions sorted by time stamp into order transactions and execution transactions;

for each order transaction, iteratively, (a) creating a new sequence line on a display for each unique order identification; and (b) placing each order transaction in time-stamp order on a sequence line corresponding to the unique order identification;

for each execution transaction, iteratively, (a) creating a new sequence line on the display for each unique order identification; and (b) placing each execution transaction in time-stamp order on a sequence line corresponding to the unique order identification;

marking the triggering transaction on the display; and for each sequence line calculating a percentage of orders executed of total orders on the sequence line and displaying the percentage.

2. The method according to claim 1, comprising positioning a transaction icon representing a single transaction in a sequence line on the display.

3. The method according to claim 2, comprising positioning transaction type information immediately over each transaction icon.

4. The method according to claim 2, wherein the display includes transaction type information next to each transaction icon.

5. The method according to claim 2, wherein the transaction icon graphically identifies the associated transaction as a buy order, a buy execution, a sell order or a sell execution based on distinct color and graphic content.

6. The method according to claim 1, wherein the transaction type metadata indicates whether the transaction is a new, amended or canceled transaction.

7. The method according to claim 1, comprising placing a customer type label next to each sequence line, the customer type label indicating a customer type selected from broker-dealer, customer, employee and proprietary.

8. The method according to claim 7, wherein the customer type label is positioned immediately below each sequence line.

9. A system for tracking and displaying transactions, the system comprising:

a display screen displaying transaction information from related transactions; and a server comprising a processor configured to:
load transactions related to an alert including one triggering transaction;
identify metadata associated with the transactions, including transaction type metadata, order identification metadata, customer type metadata, and triggering transaction metadata;
sort the transactions by time-stamp;
sort the transactions sorted by time stamp into order transactions and execution transactions;
for each order transaction, iteratively, (a) create a new sequence line on the display screen for each unique order identification; and (b) place each order transaction in time-stamp order on a sequence line corresponding to the unique order identification;
for each execution transaction, iteratively, (a) create a new sequence line on the display screen for each unique order identification; and (b) place each execution transaction in time-stamp order on a sequence line corresponding to the unique order identification;
mark the triggering transaction on the display screen; and
for each sequence line calculate a percentage of orders executed of total orders on the sequence line and display the percentage.

10. The system according to claim 9, wherein the processor is configured to position a transaction icon representing a single transaction in a sequence line on the display.

11. The system according to claim 10, wherein the processor is configured to position transaction type information immediately over each transaction icon.

12. The system according to claim 10, wherein the display screen includes transaction type information next to each transaction icon.

13. The system according to claim 10, wherein the transaction icon graphically identifies the associated transaction as a buy order, a buy execution, a sell order or a sell execution based on distinct color and graphic content.

14. The system according to claim 9, wherein the transaction type metadata indicates whether the transaction is a new, amended or canceled transaction.

15. The system according to claim 9, wherein the processor is configured to place a customer type label next to each sequence line, the customer type label indicating a customer type selected from broker-dealer, customer, employee and proprietary.

16. The system according to claim 15, wherein the customer type label is positioned immediately below each sequence line.

17. A method, comprising:

identifying metadata associated with transactions related to an alert, including transaction type metadata, order identification metadata, customer type metadata, and triggering transaction metadata;

sorting the transactions into order transactions and execution transactions;

create a horizontal time axis;

for each order transaction, iteratively, (a) creating a new sequence line on a display for each unique order identification; and (b) placing each order transaction in time-stamp order on a sequence line corresponding to the unique order identification;

for each execution transaction, iteratively, (a) creating a new sequence line on the display for each unique order identification; and (b) placing each execution transaction in time-stamp order on a sequence line corresponding to the unique order identification;

marking the triggering transaction on the display; and for each sequence line calculating a percentage of orders executed of total orders on the sequence line and displaying the percentage.

18. The method according to claim 17, comprising positioning a transaction icon representing a single transaction in a sequence line on the display.

19. The method according to claim 17, comprising placing a customer type label next to each sequence line, the customer type label indicating a customer type selected from broker-dealer, customer, employee and proprietary.

20. The method according to claim 17, wherein the customer type label is positioned immediately below each sequence line.

* * * * *